United States Patent
Mochizuki et al.

(10) Patent No.: US 10,752,774 B2
(45) Date of Patent: *Aug. 25, 2020

(54) POLYORGANOSILOXANE COMPOSITION FOR MOLDING, OPTICAL MEMBER, LIGHT SOURCE LENS OR COVER, AND MOLDING METHOD

(71) Applicant: MOMENTIVE PERFORMANCE MATERIALS JAPAN LLC, Minato-ku, Tokyo (JP)

(72) Inventors: Kikuo Mochizuki, Tokyo (JP); Hidefumi Tagai, Tokyo (JP); Masanari Shimakawa, Tokyo (JP); Kazuki Shinbo, Tokyo (JP)

(73) Assignee: MOMENTIVE PERFORMANCE MATERIALS JAPAN LLC, Tokyo (JP)

(*) Notice: Subject to any disclaimer, the term of this patent is extended or adjusted under 35 U.S.C. 154(b) by 270 days.

This patent is subject to a terminal disclaimer.

(21) Appl. No.: 15/624,087

(22) Filed: Jun. 15, 2017

(65) Prior Publication Data

US 2017/0283614 A1   Oct. 5, 2017

Related U.S. Application Data

(63) Continuation of application No. PCT/JP2015/085501, filed on Dec. 18, 2015.

(30) Foreign Application Priority Data

Dec. 18, 2014 (JP) ................. 2014-255835
Dec. 18, 2014 (JP) ................. 2014-255836
Dec. 18, 2014 (JP) ................. 2014-255837

(51) Int. Cl.

| | |
|---|---|
| C08L 83/04 | (2006.01) |
| F21V 3/06 | (2018.01) |
| C08K 5/521 | (2006.01) |
| C08K 5/524 | (2006.01) |
| C08G 77/20 | (2006.01) |
| G02B 1/04 | (2006.01) |
| C08G 77/06 | (2006.01) |
| F21V 25/12 | (2006.01) |
| B29C 43/00 | (2006.01) |
| B29C 45/00 | (2006.01) |
| F21Y 115/10 | (2016.01) |
| B29K 83/00 | (2006.01) |
| B29L 11/00 | (2006.01) |

(52) U.S. Cl.
CPC ............ *C08L 83/04* (2013.01); *B29C 43/003* (2013.01); *B29C 45/0001* (2013.01); *C08G 77/06* (2013.01); *C08G 77/20* (2013.01); *C08K 5/521* (2013.01); *C08K 5/524* (2013.01); *F21V 3/06* (2018.02); *F21V 3/062* (2018.02); *F21V 25/12* (2013.01); *G02B 1/04* (2013.01); *G02B 1/041* (2013.01); *B29K 2083/00* (2013.01); *B29L 2011/00* (2013.01); *C08L 2205/025* (2013.01); *C08L 2205/03* (2013.01); *C08L 2205/06* (2013.01); *F21Y 2115/10* (2016.08); *Y10T 428/1045* (2015.01); *Y10T 428/1068* (2015.01); *Y10T 428/2852* (2015.01)

(58) Field of Classification Search
CPC .. C08L 83/04; C08L 83/220506; C08L 83/00; B29L 2011/00; C08G 77/20; C08G 77/08; C08G 77/12; B29K 2083/00; Y10T 428/1045; Y10T 428/1068; Y10T 428/2852; F21Y 2115/10
USPC ...... 428/1.32, 1.52, 356, 429; 525/478, 479; 528/15; 524/588
See application file for complete search history.

(56) References Cited

U.S. PATENT DOCUMENTS

| | | |
|---|---|---|
| 2,676,182 A | 4/1954 | Daudt et al. |
| 3,635,874 A | 1/1972 | Laur et al. |
| 3,652,488 A | 3/1972 | Harder |
| 4,472,563 A | 9/1984 | Chandra et al. |
| 4,882,398 A | 11/1989 | Mbah |
| 5,122,562 A | 6/1992 | Jeram et al. |
| 5,548,038 A | 8/1996 | Enami et al. |
| 5,932,668 A | 8/1999 | Friebe et al. |
| 2006/0264567 A1 | 11/2006 | Shiobara et al. |
| 2006/0264583 A1 | 11/2006 | Kashiwagi et al. |
| 2007/0106016 A1 | 5/2007 | Zhu |

(Continued)

FOREIGN PATENT DOCUMENTS

| | | |
|---|---|---|
| EP | 1 845 133 A1 | 10/2007 |
| JP | H11-140319 A | 5/1999 |

(Continued)

OTHER PUBLICATIONS

"Reactive Silicones: Forging New Polymer Links" Gelest catalog for polysiloxane materials (2004) 64 pages.

(Continued)

*Primary Examiner* — Ruiyun Zhang
(74) *Attorney, Agent, or Firm* — Foley & Lardner LLP

(57) ABSTRACT

A polyorganosiloxane composition for molding includes: (A) a straight-chain polyorganosiloxane having two or more alkenyl groups and having a viscosity (25° C.) of 10,000 to 500,000 mPa·s; (B) 30 to 80 mass % of a resinoid polyorganosiloxane including M, D, and Q units, at a molar ratio of a:b:c, on average ($0.3 \leq a \leq 0.6$, $0 \leq b \leq 0.1$, $0.4 \leq c \leq 0.7$, and $a+b+c=1$), and having two or more alkenyl groups; (C) an amount of a polyorganohydrogensiloxane having Si-bonded hydrogen atoms, an average degree of polymerization of 10 or more, a content of the Si-bonded hydrogen atoms of 5.0 mmol/g or more and 11.0 mmol/g or less, and a mass decrease rate up to 140° C. by TGA of 2.0 mass % or less so that an amount of the (Si-bonded hydrogen atoms/alkenyl groups) is 1.0 to 3.0 mol; and (D) a hydrosilylation reaction catalyst. A cured product excellent in mold release property is obtained and contamination of a metal mold is prevented.

15 Claims, No Drawings

(56) References Cited

U.S. PATENT DOCUMENTS

| | | |
|---|---|---|
| 2009/0281243 A1 | 11/2009 | Takanashi et al. |
| 2009/0305036 A1 | 12/2009 | Aoki |
| 2010/0197870 A1 | 8/2010 | Kashiwagi et al. |
| 2011/0281123 A1 | 11/2011 | Yoshida et al. |
| 2011/0294950 A1 | 12/2011 | Hasegawa et al. |
| 2012/0029151 A1 | 2/2012 | Takanashi et al. |
| 2012/0065343 A1 | 3/2012 | Bahadur et al. |
| 2014/0275384 A1 | 9/2014 | Takahashi |
| 2016/0280918 A1 | 9/2016 | Kumar et al. |

FOREIGN PATENT DOCUMENTS

| | | |
|---|---|---|
| JP | H11-140320 A | 5/1999 |
| JP | 2006-328102 A | 12/2006 |
| JP | 2006-328103 A | 12/2006 |
| JP | 2006-335857 A | 12/2006 |
| JP | 2007-038443 A | 2/2007 |
| JP | 2008-127517 A | 6/2008 |
| JP | 2010-047646 A | 3/2010 |
| JP | 4697405 B2 | 6/2011 |
| JP | 5475295 B2 | 4/2014 |
| JP | 2014-125624 A | 7/2014 |
| JP | 5568240 B2 | 8/2014 |
| JP | 2014-185229 A | 10/2014 |
| WO | WO-2008/047892 A1 | 4/2008 |
| WO | WO-2013/084699 A1 | 6/2013 |

OTHER PUBLICATIONS

Mochizuki, Non-Final Office Action in U.S. Appl. No. 15/623,958 dated Aug. 29, 2018.
Mochizuki: Notice of Allowance in U.S. Appl. No. 15/623,958 dated Jan. 10, 2019.

POLYORGANOSILOXANE COMPOSITION FOR MOLDING, OPTICAL MEMBER, LIGHT SOURCE LENS OR COVER, AND MOLDING METHOD

CROSS-REFERENCE TO RELATED APPLICATIONS

This application is a continuation of prior International Application No. PCT/JP2015/085501 filed on Dec. 18, 2015, which is based upon and claims the benefit of priority from Japanese Patent Applications Nos. 2014-255835 filed on Dec. 18, 2014, 2014-255836 filed on Dec. 18, 2014, and 2014-255837 filed on Dec. 18, 2014; the entire contents of all of which are incorporated herein by reference.

FIELD

The present invention relates to a polyorganosiloxane composition for molding, an optical member, a light source lens or cover, and a molding method using the polyorganosiloxane composition for molding.

BACKGROUND

Conventionally, polyorganosiloxane compositions curing into silicone rubber have been well known, and are widely used as a potting material, a coating material, a molding material for shaping, injection molding and so on, and a covering material in an electric and electronic field, and optical and optoelectronics, sensor, architecture fields, utilizing its excellent properties such as weather resistance, heat resistance, electrical insulation, hardness, mechanical strength, elongation and so on. Among them, a polyorganosiloxane composition which cures by an addition reaction increases in usage in the above-described fields because it quickly cures by appropriate heating and releases no corrosive substance during curing.

Then, for increasing the productivity in the injection molding, it is necessary to remove the cured product after molding from the metal mold as quick as possible and to perform next molding. Therefore, a polyorganosiloxane composition forming a cured product excellent in mold release property with respect to the metal mold is desired.

As the polyorganosiloxane composition from which the cured product excellent in mold release property is obtained, a curing composition has been proposed which is made by mixing in advance an alkenyl group-containing polyorganosiloxane and a reinforcing filler, performing heat treatment or uniformly mixing them, then mixing a hydrogen atom-containing polyorganosiloxane and a platinum-based catalyst to the obtained compound, and further adding and mixing a polyorganosiloxane containing hydroxyl groups bonded to silicon atoms in a molecule as a component for improving the mold release property (refer to, for example, Patent Reference 1 (JP-A Hei 11-140319)).

Besides, a silicone resin composition has been proposed which contains, as essential components, an organopolysiloxane having two or more alkenyl groups in one molecule, an organohydrogenpolysiloxane having two or more hydrogen atoms bonded to silicon atoms in one molecule, a platinum-based metal catalyst, and a release agent such as a fatty acid ester of an erythritol derivative, and has excellent metal mold release property (refer to, for example, Patent Reference 2 (Japanese Patent No. 4697405)).

However, both of the compositions described in Patent Reference 1 and Patent Reference 2 are insufficient in mold release property of the cured product with respect to the metal mold. Further, the compositions have a problem in formation of a coating of silicone on the surface (molding surface) of the metal mold when molding is repeated, causing a decrease in quality of a molded product (lens or the like). Hence, it is necessary to wash the molding surface of the metal mold so as to remove the silicone coating, but the metal mold having a complicated shape is difficult to wash, and therefore a molding silicone composition never contaminating the metal mold is desired.

Moreover, as curable silicone compositions, a silicone composition has been proposed, as a curing silicone composition, which contains an alkenyl group-containing organopolysiloxane composed of a dialkylpolysiloxane having two or more alkenyl groups, on average, in a molecule and having a predetermined viscosity and an organopolysiloxane having a tetrafunctional siloxane unit and containing a alkenyl group at a predetermined rate as a main component, an organohydrogenpolysiloxane having a tetrafunctional siloxane unit and containing a silicon atom-bonded hydrogen atom at a predetermined rate, and a hydrosilylation reaction catalyst, and having a hardness of 30 or more and 80 or less and an elongation of 50% or more (in conformity with JIS K6253), or having a hardness of 75 or less and an elongation of 35% or more (refer to, for example, Patent Reference 3 (Japanese Patent No. 5475295) and Patent Reference 4 (Japanese Patent No. 5568240)).

However, the compositions described in Patent Reference 3 and Patent Reference 4 also have a problem in the cured product being poor in mold release property with respect to the metal mold and being likely to contaminate the metal mold.

SUMMARY OF THE INVENTION

The present invention has been made to solve the problems, and its object is to provide a polyorganosiloxane composition for molding excellent in moldability such as injection molding, easy to remove a cured product from a metal mold, and no contaminating of the metal mold.

A polyorganosiloxane composition for molding of the present invention comprises:

(A) a straight-chain polyorganosiloxane having two or more alkenyl groups bonded to silicon atoms, on average, in one molecule and having a viscosity at 25° C. of 10,000 to 1,000,000 mPa·s;

(B) 30 to 80 mass % of a polyorganosiloxane relative to a total of the (A) component and this component (B), the polyorganosiloxane having a resin structure including a monofunctional siloxane unit represented by a formula: $R^1_3SiO_{1/2}$ (in the formula, $R^1$s independently represent an alkenyl group or a substituted or unsubstituted alkyl group), a bifunctional siloxane unit represented by a formula: $R^1_2SiO_{2/2}$ (in the formula, $R^1$s are as in the above), and a tetrafunctional siloxane unit represented by a formula: $SiO_{4/2}$, at a molar ratio of a:b:c, on average (where $0.3 \leq a \leq 0.6$, $0 \leq b \leq 0.1$, $0.4 \leq c \leq 0.7$, and a relation of $a+b+c=1$ is satisfied), and having two or more alkenyl groups bonded to silicon atoms, on average, in one molecule;

(C) an amount of a polyorganohydrogensiloxane having a hydrogen atom bonded to a silicon atom, an average degree of polymerization of 10 or more, a content of the hydrogen atom of 5.0 mmol/g or more and 11.0 mmol/g or less, and a weight decrease rate up to 140° C. by thermogravimetric analysis (TGA) of 2.0 wt % or less so that an amount of the hydrogen atom in this component is 1.0 to 3.0 mol relative to a total 1 mol of the alkenyl group in the (A) component and the alkenyl group in the (B) component; and (D) a catalytic amount of a hydrosilylation reaction catalyst.

An optical member, a light source lens or cover of the present invention is made by curing the above-described polyorganosiloxane composition for molding of the present invention.

A molding method of the present invention includes: molding by a method selected from injection molding, compression molding, transfer molding, potting, and dispensing, using the above-described polyorganosiloxane composition for molding of the present invention.

Note that in the following description, an "alkenyl group bonded to a silicon atom" is sometimes referred to simply as an "alkenyl group". Besides, a "hydrogen atom bonded to a silicon atom" is sometimes referred to as an "Si-bonded hydrogen atom".

According to the polyorganosiloxane composition for molding of the present invention, a cured product having sufficient rubber hardness and excellent release property with respect to a metal mold and mechanical properties (strength, elongation and the like) can be obtained. Further, the cured product can be suppressed in change in color (yellowing) and is excellent in transparency. Furthermore, the polyorganosiloxane composition is superior in non-contamination property to the metal mold and therefore excellent in productivity of molded products.

DETAILED DESCRIPTION

Hereinafter, embodiments of the present invention will be described.

[Polyorganosiloxane Composition for Molding]

A polyorganosiloxane composition for molding in the embodiment of the present invention, includes (A) a straight-chain polyorganosiloxane having two or more alkenyl groups, on average, in one molecule and having a viscosity at 25° C. of 10,000 to 1,000,000 mPa·s, (B) a polyorganosiloxane in a resin structure including a monofunctional siloxane unit, a bifunctional siloxane unit, and a tetrafunctional siloxane unit at a specific molar ratio, and containing two or more alkenyl groups, on average, in one molecule, (C) a polyorganohydrogensiloxane having an average degree of polymerization of 10 or more, including a content of Si-bonded hydrogen atoms of 5.0 mmol/g or more and 11.0 mmol/g or less, and having a weight decrease rate up to 140° C. by TGA of 2.0 wt % or less, and (D) a hydrosilylation reaction catalyst.

Hereinafter, the components of (A) to (D) will be described.

<(A) Component>

The (A) component is a polyorganosiloxane having two or more alkenyl groups, on average, in one molecule and having a viscosity at 25° C. of 10,000 to 1,000,000 mPa·s (10 to 1,000 Pa·s). The molecular structure of the (A) component is a straight-chain shape having a main chain basically composed of repeated diorganosiloxane units and both ends terminated with triorganosiloxy groups. The (A) component is a base polymer of the polyorganosiloxane composition for molding of the present invention, together with the later-described (B) component.

Examples of an alkenyl group bonded to a silicon atom in the (A) component include the ones having a number of carbon atoms of 2 to 8, more preferably 2 to 4, such as a vinyl group, an allyl group, a butenyl group, a pentenyl group, a hexenyl group, a heptenyl group and so on. The vinyl group is particularly preferable. The alkenyl group may be bonded to a silicon atom at one of the end and the middle of a molecular chain, or may be bonded to both silicon atoms at the end and the middle of a molecular chain.

An example of an organic group bonded to a silicon atom other than the alkenyl group in the (A) component is an unsubstituted or substituted monovalent hydrocarbon group. Examples of the unsubstituted monovalent hydrocarbon group include: alkyl groups having a number of carbon atoms of 1 to 10, such as a methyl group, an ethyl group, a propyl group, a butyl group, a pentyl group, a hexyl group, a cyclohexyl group, and a heptyl group; aryl groups having a number of carbon atoms of 6 to 14, such as a phenyl group, a tolyl group, a xylyl group, and a naphthyl group; and aralkyl groups such as a benzyl group and a phenethyl group. Besides, examples of the substituted monovalent hydrocarbon group include halogenated alkyl groups such as a chloromethyl group, a 3-chloropropyl group, and a 3,3,3-trifluoropropyl group. As the organic group other than the alkenyl group, the methyl group or the phenyl group is preferable.

The viscosity at 25° C. of the (A) component (hereinafter, simply referred to as a viscosity) is 10,000 to 1,000,000 mPa·s. The viscosity of the (A) component is preferably 10,000 to 700,000 mPa·s, more preferably 50,000 to 500,000 mPa·s, and particularly preferably 60,000 to 200,000 mPa·s. When the viscosity of the (A) component is 10,000 to 1,000,000 mPa·s, workability of the composition is excellent and, preferably, physical properties of a cured product of this composition are also excellent.

Concrete examples of the (A) component include both ends trimethylsiloxy group-terminated dimethylsiloxane/methylvinylsiloxane copolymer, both ends dimethylvinylsiloxy group-terminated dimethylsiloxane/methylphenylsiloxane copolymer, both ends dimethylvinylsiloxy group-terminated dimethylpolysiloxane, both ends dimethylvinylsiloxy group-terminated dimethylsiloxane/methylvinylsiloxane copolymer, both ends dimethylvinylsiloxy group-terminated dimethylsiloxane/methylvinylsiloxane/methylphenylsiloxane terpolymer, both ends trivinylsiloxy group-terminated dimethylpolysiloxane, both ends dimethylvinylsiloxy group-terminated dimethylsiloxane/diphenylsiloxane copolymer, and the like.

One kind of the polymers, copolymers and terpolymer can be used independently, or two or more kinds of them can be used in combination. In the case of using, among them, a straight-chain polyorganosiloxane in which all of organic groups other than the alkenyl groups bonded to silicon atoms are methyl groups, namely, both ends trimethylsiloxy group-terminated dimethylsiloxane/methylvinylsiloxane copolymer, both ends dimethylvinylsiloxy group-terminated dimethylpolysiloxane, or both ends dimethylvinylsiloxy group-terminated dimethylsiloxane/methylvinylsiloxane copolymer, a cured product superior in mechanical properties such as tensile strength, elongation and the like can be obtained.

<(B) Component>

The (B) component is a polyorganosiloxane having a resin structure (three-dimensional network structure) including a monofunctional siloxane unit represented by a formula: $R^1_3SiO_{1/2}$, a bifunctional siloxane unit represented by a formula: $R^1_2SiO_{2/2}$, and a tetrafunctional siloxane unit represented by a formula: $SiO_{4/2}$ (hereinafter, referred to as Q unit) at a molar ratio of monofunctional siloxane unit: bifunctional siloxane unit:Q unit=a:b:c, on average, and having two or more alkenyl groups, on average, in one molecule (hereinafter, referred to as a resinoid polyorganosiloxane).

In the above unit formulas, $R^1$s independently represent an alkenyl group or a substituted or unsubstituted alkyl group. At least one of a plurality of $R^1$s existing in one molecule of the resinoid polyorganosiloxane is an alkenyl group. Examples of the alkenyl group include a vinyl group, an allyl group, a butenyl group, a pentenyl group, a hexenyl group, a heptenyl group and the like. The vinyl group is preferable. Examples of the unsubstituted alkyl group include a methyl group, an ethyl group, a propyl group, a butyl group, a pentyl group, a hexyl group, and a heptyl group and the like. Examples of the substituted alkyl group include halogen-substituted alkyl groups with a hydrogen atom substituted by a halogen atom, such as a chloromethyl group, a 3-chloropropyl group, and a 3,3,3-trifluoropropyl group. As the substituted or unsubstituted alkyl group, the methyl group is preferable.

The a, b, c are positive numbers of $0.3 \leq a \leq 0.6$, $0 \leq b \leq 0.1$, $0.4 \leq c \leq 0.7$ and satisfying a relation of $a+b+c=1$. More preferable ranges of the a, b, c are $0.35 \leq a \leq 0.55$, $0 \leq b \leq 0.05$, $0.45 \leq c \leq 0.65$.

The number of alkenyl groups included in the resinoid polyorganosiloxane is two or more, on average, in one molecule. When a resinoid polyorganosiloxane having less than two alkenyl groups, on average, in one molecule is used as the (B) component, the metal mold release property and the non-contamination property of the composition unfavorably deteriorate. In the case where a cured product is required to have high hardness, the number of alkenyl groups is preferably 2.2 or more on average.

By using the resinoid polyorganosiloxane containing the monofunctional siloxane unit, the bifunctional siloxane unit, and the Q unit at the above-described molar ratio and having two or more alkenyl groups, on average, in one molecule as the (B) component, a composition excellent in metal mold release property and non-contamination property can be obtained.

Further, the resinoid polyorganosiloxane being the (B) component has one or more substituted or unsubstituted alkyl groups bonded to silicon atoms in one molecule and has zero or more alkoxy groups bonded to silicon atoms in one molecule. Further, the molar ratio of the alkoxy groups to the substituted or unsubstituted alkyl groups (the number of moles of alkoxy groups/the number of moles of substituted or unsubstituted alkyl groups, hereinafter, referred to also as alkoxy groups/alkyl groups) is preferably 0.030 or less.

Here the resinoid polyorganosiloxane having zero or more alkoxy groups bonded to silicon atoms also includes a polyorganosiloxane having zero alkoxy group in one molecule and a value of the alkoxy groups/alkyl groups of zero.

When a resinoid polyorganosiloxane having alkoxy groups/alkyl groups of more than 0.030 is used as the (B) component, a composition to be obtained deteriorates in metal mold release property to become more likely to contaminate the metal mold. The molar ratio in the resinoid polyorganosiloxane (alkoxy groups/alkyl groups) is preferably 0.020 or less, and particularly preferably 0.015 or less. The alkoxy groups/alkyl groups is most preferably 0.

The contents (numbers of moles) of the alkoxy groups and alkyl groups in the resinoid polyorganosiloxane can be obtained more easily by nuclear magnetic resonance spectroscopy (NMR) or the like.

The resinoid polyorganosiloxane can be represented by an average unit formula: $(R^1_3SiO_{1/2})_a(R^1_2SiO_{2/2})_b(SiO_{4/2})_c(OR^0)_p$.

In the above average unit formula, $R^1$ and a, b, c are as described above, $R^0$ is an unsubstituted alkyl group. Examples of the unsubstituted alkyl group include a methyl group and an ethyl group. P is a positive number to make the value of the alkoxy groups/alkyl groups be 0.030 or less, more preferably 0.020 or less, and particularly preferably 0.015 or less.

Examples of the resinoid polyorganosiloxane being the (B) component include a copolymer having a monofunctional siloxane unit represented by a formula: $R^3_3SiO_{1/2}$ ($R^3$ represents an unsubstituted alkyl group, and a plurality of $R^3$s may be different, this also applies to the following) (hereinafter, also referred to as $R^3_3SiO_{1/2}$ unit), a monofunctional siloxane unit represented by a formula: $R^3_2R^4SiO_{1/2}$ ($R^4$ represents an alkenyl group, this also applies to the following) (hereinafter, also referred to as $R^3_2R^4SiO_{1/2}$ unit), a bifunctional siloxane unit represented by a formula: $R^3_2SiO_{2/2}$ (hereinafter, also referred to as $R^3_2SiO_{2/2}$ unit), and a tetrafunctional siloxane unit represented by a formula: $SiO_{4/2}$ (Q unit), a copolymer composed of the $R^3_3SiO_{1/2}$ unit, the $R^3_2R^4SiO_{1/2}$ unit, and the Q unit, and a copolymer composed of the $R^3_2R^4SiO_{1/2}$ unit, the $R^3_2SiO_{2/2}$ unit, and the Q unit. One kind of the copolymers can be used independently, or two or more kinds of them can be used in combination.

Among the above-described copolymers, the copolymer having siloxane units composed of the $R^3_3SiO_{1/2}$ unit, the $R^3_2R^4SiO_{1/2}$ unit, and the Q unit is preferable.

From the viewpoint of the metal mold release property and the non-contamination property, a copolymer having as less ($OR^0$) groups as possible is more preferable, and a copolymer having no ($OR^0$) group is particularly preferable.

More specifically, a copolymer having the siloxane units including a monofunctional siloxane unit represented by a formula: $(CH_3)_2(CH_2=CH)SiO_{1/2}$ (hereinafter, expressed as $M^{vi}$ unit), a monofunctional siloxane unit represented by a formula: $(CH_3)_3SiO_{1/2}$ (hereinafter, expressed as M unit), and a tetrafunctional siloxane unit represented by a formula: $SiO_{4/2}$ (Q unit), is preferable.

Generally, the resinoid polyorganosiloxane can be obtained by adding water to chlorosilane and alkoxysilane to hydrolyze them. To obtain the (B) resinoid polyorganosiloxane to be compounded in the composition of the present invention, it is preferable to adjust the content rate of the alkoxy group (methoxy group, ethoxy group and the like) contained in the resinoid polyorganosiloxane being the (B) component to a certain content rate or less. The method of adjusting the content rate of the alkoxy group to a certain content rate or less is not particularly limited, and examples of the method include controlling the reaction temperature, time or the like of the hydrolysis, performing extraction and removal using a water-soluble solvent such as alcohol, and the like. The resinoid polyorganosiloxane having a low content rate of the alkoxy group can be obtained, for example, by performing the following steps (1) to (3) in sequence.

(1) A step of hydrolyzing at least three kinds selected from silicon compounds represented by formulas: $R^1_3SiW$, $R^1_2SiW_2$, $SiW_4$, with a mixed solution of acetone and water.

(2) A step of removing acid and acetone by water washing after the (1) step.

(3) A step of adding alkali and heating after the (2) step.

In the silicon compounds used as starting materials in the (1) step, $R^1$s independently represent an alkenyl group or a substituted or unsubstituted alkyl group, and the same groups as above-mentioned ones can be exemplified. Besides, Ws independently represent a chlorine atom, an alkoxy group, or a hydroxyl group. Examples of the silicon compounds include tetraethoxysilane, chlorodimethylvinylsilane, chlorotrimethylsilane, dichlorodimethylsilane and the like. Then, three or more kinds are selected from among those silicon compounds and used.

Note that as at least one kind of the three kinds of silicon compounds used as the starting materials, a silicon compound having one or more alkenyl groups as $R^1$s is used. Further, it is preferable to use, as at least one kind of silicon compound, a silicon compound having one or more chlorine atoms as Ws.

The mixing ratio between acetone and water is preferably in a range of acetone:water of 1:1 to 1:4 (mass ratio). The hydrolysis can be performed by a well known method. Further, in the (2) step, the water washing method is not particularly limited, and a well known method can be used.

In the (3) step, examples of the alkali to be added to the solution obtained in the (2) step include potassium hydroxide, cesium hydroxide and the like. Then, such alkali is added by a well known method and heating and dehydration are performed, and then neutralization is performed using a phosphoric acid or the like to obtain the resinoid polyorganosiloxane.

A preferable weight-average molecular weight Mw of the resinoid polyorganosiloxane (B) is 1,500 to 10,000, and is more preferably in a range of 2,200 to 8,000. Note that Mw is a value converted into polystyrene by gel permeation chromatography (hereinafter, described as GPC). When the Mw of the resinoid polyorganosiloxane is less than 1,500, sufficient mechanical strength cannot be stably obtained, whereas when it is more than 10,000, the viscosity of this composition increases to lose flowability and deteriorate in injection molding property.

The resinoid polyorganosiloxane being the (B) component is a polymer component of the composition of the present invention together with the straight-chain polyorganosiloxane being the (A) component. The compounding ratio between the (B) resinoid polyorganosiloxane and the (A) straight-chain polyorganosiloxane is preferably such a ratio that the (B) component is 30 to 80 mass % and the (A) component is 70 to 20 mass % to the total (100 mass %) of the (A) component and the (B) component. When the compounding rate of the (B) component is less than 30 mass %, sufficient hardness of cured product cannot be obtained. When the compounding rate of the (B) component is more than 80 mass %, the viscosity of the composition may be high to deteriorate in workability. The compounding rate of the (B) component is more preferably 35 to 70 mass %, and particularly preferably 37 to 65 mass %.

<(C) Component>

The (C) component is a polyorganohydrogensiloxane having one or more hydrogen atom bonded to silicon atom (Si-bonded hydrogen atom), an average degree of polymerization of 10 or more, and a content of Si-bonded hydrogen atom of 5.0 mmol/g or more and 11.0 mmol/g or less. The polyorganohydrogensiloxane being the (C) component acts as a crosslinking agent by reaction of its Si-bonded hydrogen atom with the alkenyl group in the (A) component or the (B) component. The molecular structure of the (C) component is not particularly limited, and, for example, various kinds of polyorganohydrogensiloxanes having straight-chain, cyclic, branched, three-dimensional network shapes can be used. One kind of them can be used independently, or two or more kinds of them can be used in combination.

From the viewpoint of ease of controlling the viscosity and the amount of Si-bonded hydrogen atom, a straight-chain one is preferable as the (C) component. When the polyorganohydrogensiloxane (C) has straight-chain shape, the Si-bonded hydrogen atom may be located at only one of the end and the middle of a molecular chain, or may be located at both of them. In terms of being capable of appropriately adjusting the hardness of a cured product, a straight-chain polyorganohydrogensiloxane having the Si-bonded hydrogen atom at the middle of a molecular chain is preferable.

In the polyorganohydrogensiloxane being the (C) component, the average degree of polymerization corresponds to the number of silicon atoms in one molecule, and is also the number of siloxane units existing in one molecule. The average degree of polymerization of the (C) component is 10 or more. The average degree of polymerization is preferably 10 to 350, and more preferably 20 to 150. Further, the content of the Si-bonded hydrogen atom per unit mass of the (C) component is 5.0 mmol/g or more and 11.0 mmol/g or less. The content of the Si-bonded hydrogen atom is preferably in a range of 6.0 mmol/g to 10.0 mmol/g.

More specifically, the component (C) is preferably a straight-chain polyorganohydrogensiloxane represented by a molecular formula: $(R^2{}_3SiO_{1/2})(R^2HSiO_{2/2})_x(R^2{}_2SiO_{2/2})_y(R^2{}_3SiO_{1/2})$ or a molecular formula: $(R^2{}_2HSiO_{1/2})(R^2HSiO_{2/2})_x(R^2{}_2SiO_{2/2})_y(R^2{}_2HSiO_{1/2})$.

Here, $R^2$s independently represent a substituted or unsubstituted monovalent hydrocarbon group except an alkenyl group. Examples of $R^2$ include: an alkyl group having a number of carbon atoms of 1 to 10, such as a methyl group, an ethyl group, a propyl group, a butyl group, a pentyl group, a hexyl group, a cyclohexyl group, and a heptyl group; an aryl group having a number of carbon atoms of 6 to 14, such as a phenyl group, a tolyl group, a xylyl group, and a naphthyl group; an aralkyl group such as a benzyl group and a phenethyl group; and a halogenated alkyl group such as a chloromethyl group, a 3-chloropropyl group, and a 3,3,3-trifluoropropyl group. As $R^2$, the methyl group or the phenyl group is preferable.

In the above formulas, both x and y are positive integer numbers, and a relation of $8 \leq x+y \leq 300$ and $0.4 \leq x/(x+y) \leq 0.7$ is satisfied. Here, x+y represents the number of siloxane units at the middle of the molecular chain. In the polyorganohydrogensiloxane, the average degree of polymerization being the number of silicon atoms in one molecule is x+y+2. A preferable range of x+y is 30 or more and 300 or less, and a particularly preferable range is 100 or more and 200 or less.

To attain the object of the present invention, the polyorganohydrogensiloxane being the (C) component contains no low-molecular weight component, and has a weight decrease rate from room temperature (for example, 25° C.) to 140° C. by thermogravimetric analysis (TGA) of 2.0 wt % or less. The weight decrease rate by TGA is more preferably 2.0 wt % or less up to 180° C. Though the condition of measurement by TGA is not particularly limited, the weight decrease rate can be measured under such a condition of, for example, increasing the temperature at a increasing rate of 5° C. per minute from room temperature. As a TGA apparatus, for example, an apparatus name TG/DTA 6200 (manufactured by SII Nano Technology, Inc.) can be exemplified.

Examples of the method of obtaining the polyorganohydrogensiloxane having the weight decrease rate of 2.0 wt % or less up to 140° C. include a method of heating to 130° C. or higher under a reduced pressure condition, a method of performing thin-film distillation, a method of performing molecular distillation and the like. The thin-film distillation is a method of distilling a raw material in a thin film state by a wiper under reduced pressure or centrifugal force. In the thin-film distillation method, an increase in the boiling point due to liquid depth is suppressed and therefore distillation under a condition of a lower boiling point is possible. Besides, the molecular distillation is a method of performing distillation with a condensation plane (condenser) provided near an evaporation plane in addition to the above, and therefore distillation at a higher vacuum becomes possible.

The compounding amount of the polyorganohydrogensiloxane (C) is an effective amount for curing the (A) component and the (B) component. The compounding amount is set so that an amount of Si-bonded hydrogen atom in the (C) component is 1.0 to 3.0 mol relative to a total 1 mol of the alkenyl group in the (A) component and the alkenyl group in the (B) component. A preferable range is a range of 1.5 to 2.5 mol. When the amount of the Si-bonded hydrogen atom in the (C) component is less than 1.0 mol relative to the total 1 mol of the alkenyl group, the curing reaction does not proceed, thereby possibly making it difficult to obtain a cured product. Besides, when the amount of the Si-bonded hydrogen atom is more than 3.0 mol, a large amount of no reacted Si-bonded hydrogen atoms remain in a cured product, thereby possibly changing the physical properties of the cured product over time.

<(D) Component>

The hydrosilylation reaction catalyst being the (D) component is a catalyst that promotes an addition reaction (hydrosilylation reaction) between the alkenyl group in the (A) component and the (B) component and the Si-bonded hydrogen atom in the (C) component. The hydrosilylation reaction catalyst is not particularly limited as long as it promotes the hydrosilylation reaction. A platinum-based metal compound is preferable, and a metallic catalyst such as palladium, rhodium, cobalt, nickel, ruthenium, iron or the like can also be used.

As the platinum-based metal compound, for example, a chloroplatinic acid, an alcohol solution of the chloroplatinic acid, a platinum complex having olefines, a vinyl group-containing siloxane, or an acetylene compound as a ligand or the like can be used.

The compounding amount of the (D) platinum-based metal compound is such an amount that its content rate to the whole composition is 0.5 to 10 mass ppm when converted into a platinum element. It is more preferably 1 to 5 mass ppm, and furthermore preferably 1 to 3 mass ppm. When the compounding amount of the platinum-based metal compound is less than 0.5 mass ppm, the curability significantly decreases, whereas when it is more than 10 mass ppm, the transparency of the cured product decreases. When the compounding amount of the platinum-based metal compound is in a range of 0.5 to 10 mass ppm, a cured product excellent in physical properties can be obtained and economical advantage is also provided.

The polyorganosiloxane composition for molding of the present invention is prepared by uniformly mixing the above-described components, and its curability can be arbitrarily adjusted by addition of a reaction inhibitor. Examples of the inhibitor for the curing reaction include acetylene alcohols such as 3-methyl-1-butyne-3-ol, 2-phenyl-3-butyne-2-ol, and 1-ethynylcyclohexanol, and a maleic acid derivative such as maleic acid diallyl.

Further, the polyorganosiloxane composition for molding can also be stored while divided in two liquids to prevent curing from proceeding, and the two liquids can be mixed together in use for curing. For the two-liquid-mixing type, it is necessary to avoid storage of the polyorganohydrogensiloxane (C) and the platinum-based metal compound (D) in the same wrapper in terms of the risk of a dehydrogenation reaction.

The viscosity of the polyorganosiloxane composition for molding of the present invention thus obtained is preferably in a range of 10,000 to 1,000,000 mPa·s as a value measured by a rotational viscometer at 25° C. A more preferable range is 20,000 to 500,000 mPa·s, and a particularly preferable range is 50,000 to 300,000 mPa·s. When the viscosity is less than 10,000 mPa·s, molding failure such as liquid dripping, mixture of air or the like during molding is more likely to occur, whereas when the viscosity is more than 1,000,000 mPa·s, flowability deteriorates, resulting in difficulty in injection. In particular, an injection molding polyorganosiloxane containing no inorganic filler is difficult to increase viscosity, and therefore the viscosity of the (A) component, the molecular weight of the (B) component, the average degree of polymerization of the (C) component and the like are important.

The polyorganosiloxane composition for molding of the present invention preferably contains no inorganic filler. Even if the polyorganosiloxane composition for molding is made into a composition containing no inorganic filler, a cured product having sufficient rubber hardness and excellent mechanical properties (strength, elongation and the like) can be obtained. Further, in the case of using the polyorganosiloxane composition containing no inorganic filler, a cured product high in transmittance of light (for example, visible light) can be obtained.

The polyorganosiloxane composition for molding of the present invention cures by heating it as needed. The curing condition is not particularly limited, but the composition cures by holding it normally at a temperature of 40 to 200° C., and preferably 60 to 170° C. for about 0.5 minutes to 10 hours and more preferably for about 1 minute to 6 hours.

[Molding Method]

By molding and curing the above-described polyorganosiloxane composition for molding, a molded product can be obtained. The molding can be performed by a method selected from injection molding, compression molding, transfer molding, potting, and dispensing, and the injection molding is particularly preferable. The molded product being its cured product is excellent in property of releasing from the metal mold and in property of no contaminating the metal mold.

The molded product has sufficient rubber hardness, excellent mechanical properties (strength, elongation and the like), and excellent weather resistance. The molded product is also unlikely to change in color (yellowing) over time.

Further, in the case of using the polyorganosiloxane composition for molding containing no inorganic filler, the molded product having has a high light transmittance so that a transmittance of light with a wavelength of 400 nm is 85% or more in a thickness of 6 mm.

Accordingly, the molded product is suitable for a sealing layer of a light-emitting element in a light emitting device such as an LED device, and an optical member such as a functional lens and the like.

In particular, the molded product made by molding and curing the above-described polyorganosiloxane composition for molding by a method of die molding, injection molding or the like is superior in mold release property, excellent in mechanical properties and weather resistance, unlikely to change in color (yellowing), and high in light transmittance of visible light or the like, and therefore can be suitably used as a lens and cover for various kinds of outdoor light sources and automobile light source.

Examples of the optical member, light source lens or cover made by curing the polyorganosiloxane composition for molding of the present invention include a primary or secondary LED lens, a thick optical lens, an LED reflector, an automobile LED matrix lighting lens, an augmented reality optical member, a silicone optical head for an LED chip, a work light lens and reflector, an illumination optical member for smartphone or tablet, an LED display and a light guide for computer or television, and the like. Further, examples of the light source in the light source lens or cover include indoor or outdoor lighting, a reading light and accent lighting of public transport, an LED street light and the like.

EXAMPLES

Hereinafter, the present invention will be concretely described using examples but the present invention is not limited to the examples.

In the following description, an M unit, an $M^{vi}$ unit, a D unit, a $D^H$ unit, and a Q unit represent siloxane units represented by the following formulae respectively, and an OE unit represents an organic unit represented by the following formula.

M unit . . . $(CH_3)_3SiO_{1/2}$ $M^{vi}$ unit . . . $(CH_3)_2(CH_2=CH)SiO_{1/2}$ D unit . . . $(CH_3)_2SiO_{2/2}$ $D^H$ unit . . . $(CH_3)HSiO_{2/2}$ Q unit . . . $SiO_{4/2}$ OE unit . . . $CH_3CH_2O_{1/2}$ The viscosity is a measured value at 25° C. unless otherwise stated. Besides, the weight-average molecular weight (Mw) is a value obtained by measurement using a gel permeation chromatography (GPC) apparatus (manufactured by Shimadzu Corporation, apparatus name; Prominence GPC system, column; Shim-pack GPC-80M) using toluene as a solvent, and converted into polystyrene. Further, the nonvolatile content (mass %) is a value obtained by measurement under heating conditions of 150° C.×1 hour.

Synthesis Example 1 (Synthesis of a Resinoid Vinyl Group-Containing Methylpolysiloxane B1)

970 g (4.66 mol) of tetraethoxysilane, 42 g (0.35 mol) of chlorodimethylvinylsilane, 357 g (3.29 mol) of chlorotrimethylsilane, and 400 g of xylene were put into and stirred in a flask, and 900 g of a mixed solution of 600 g of water and 300 g of acetone was dropped thereinto. Stirring was performed at 70 to 80° C. for 1 hour and hydrolysis was performed, and then liquid separation was performed to obtain a xylene solution. Subsequently, 500 g of water was added to the obtained xylene solution, and water washing and liquid separation were performed to extract acetone in the xylene solution into the water. Then, the operation of water washing and liquid separation was repeated until the water used for the washing exhibited neutrality.

Next, 200 g of xylene and 0.18 g of potassium hydroxide were added to the obtained xylene solution, and stirring was performed while heating. After heating up to 140° C. and dehydration, reflux was performed at 140° C. for 3 hours. After cooling, neutralization was performed using a phosphoric acid to adjust so that the nonvolatile content was 50 mass %, thereby obtaining a vinyl group-containing methylpolysiloxane B1.

In the obtained vinyl group-containing methylpolysiloxane B1, a ratio between the number of hydrogen atoms derived from $CH_2$ groups in ethoxy groups and the number of hydrogen atoms derived from $CH_3$ groups bonded to silicon atoms (the number of hydrogen atoms derived from $CH_2$ groups/the number of hydrogen atoms derived from Si—$CH_3$ groups) was 0.0089 when obtained by $^1$H-NMR. This shows that the molar ratio of the alkoxy groups (ethoxy groups) to the methyl groups bonded to the silicon atoms (Si—$CH_3$ groups) (hereinafter, referred to as OR/SiMe) in B1 was 0.013.

Further, it is found from the charged amounts of the starting materials and the result of $^1$H-NMR that the obtained vinyl group-containing methylpolysiloxane B1 has the $M^{vi}$ unit, the M unit, the Q unit, and the OE unit, and the molar ratio among the units is $M^{vi}$ unit:M unit:Q unit:OE unit=0.042:0.396:0.562:0.017. The Mw of B1 measured by GPC was 3400. Besides, an average unit formula of B1 obtained from the above-described molar ratio and Mw was $M^{vi}_{2.0}M_{19.1}Q_{27.2}(OE)_{0.82}$ and the number of alkenyl groups bonded to silicon atoms in one molecule was 2.0 on average.

Synthesis Example 2 (Synthesis of a Resinoid Vinyl Group-Containing Methylpolysiloxane B2)

970 g (4.66 mol) of tetraethoxysilane, 70 g (0.58 mol) of chlorodimethylvinylsilane, 335 g (3.09 mol) of chlorotrimethylsilane, and 400 g of xylene were put into and stirred in a flask, and 600 g of water was dropped thereinto. Stirring was performed at 70 to 80° C. for 1 hour and hydrolysis was performed, and then liquid separation was performed to obtain a xylene solution. Subsequently, the obtained xylene solution was heated up to 130° C. and subjected to dehydration and dehydrochlorination. The above operation was continued until the xylene solution exhibited neutrality.

Next, 200 g of xylene and 0.18 g of potassium hydroxide were added to the obtained xylene solution, and stirring was performed while heating. After heating was performed up to 140° C., reflux was performed at 140° C. for 3 hours. After cooling, neutralization was performed using a phosphoric acid to adjust so that the nonvolatile content was 50 mass %, thereby obtaining a resinoid vinyl group-containing methylpolysiloxane B2.

In the obtained vinyl group-containing methylpolysiloxane B2, the number of hydrogen atoms derived from $CH_2$ groups/the number of hydrogen atoms derived from Si—$CH_3$ groups obtained by $^1$H-NMR was 0.0201. This shows that the OR/SiMe in B2 was 0.030.

Further, it is found from the charged amounts of the starting materials and the result of $^1$H-NMR that the vinyl group-containing methylpolysiloxane B2 has the $M^{vi}$ unit, the M unit, the Q unit, and the OE unit, and the molar ratio among the units is $M^{vi}$ unit:M unit:Q unit:OE unit=0.070:0.371:0.559:0.038. The Mw of B2 by GPC was 1850. Besides, an average unit formula of B2 obtained from the above-described molar ratio and Mw was $M^{vi}_{1.8}M_{9.6}Q_{14.5}(OE)_{0.98}$ and the number of alkenyl groups bonded to silicon atoms in one molecule was 1.8 on average.

Synthesis Example 3 (Synthesis of a Resinoid Vinyl Group-Containing Methylpolysiloxane B3)

Xylene and potassium hydroxide were added to the xylene solution after liquid separation, heating up to 140° C.

and dehydration were performed, and then reflux was performed at 140° C. for 5 hours. Other than that, the same operation as in Synthesis Example 1 was performed to obtain a vinyl group-containing methylpolysiloxane B3.

In the obtained vinyl group-containing methylpolysiloxane B3, the number of hydrogen atoms derived from $CH_2$ groups/the number of hydrogen atoms derived from Si—$CH_3$ groups obtained by $^1$H-NMR was 0.0089. This shows that the OR/SiMe in B3 was 0.013.

Further, it is found from the charged amounts of the starting materials and the result of $^1$H-NMR that the vinyl group-containing methylpolysiloxane B3 has the $M^{vi}$ unit, the M unit, the Q unit, and the OE unit, and the molar ratio among the units is $M^{vi}$ unit:M unit:Q unit:OE unit=0.042:0.396:0.562:0.017. The Mw of B3 by GPC was 3740. Besides, an average unit formula of B3 obtained from the above-described molar ratio and Mw was $M^{vi}_{2.2}M_{21.1}Q_{29.9}(OE)_{0.90}$ and the number of alkenyl groups bonded to silicon atoms in one molecule was 2.2 on average.

Synthesis Example 4 (Synthesis of a Resinoid Vinyl Group-Containing Methylpolysiloxane B4)

970 g (4.66 mol) of tetraethoxysilane, 70 g (0.58 mol) of chlorodimethylvinylsilane, 335 g (3.09 mol) of chlorotrimethylsilane, and 400 g of xylene were put into and stirred in a flask, and 900 g of a mixed solution of 600 g of water and 300 g of acetone was dropped thereinto. Stirring was performed at 70 to 80° C. for 1 hour and hydrolysis was performed, and then liquid separation was performed to obtain a xylene solution.

Next, 500 g of water was added to the obtained xylene solution, and water washing and liquid separation were performed to extract acetone in the xylene solution into the water. Then, the operation of water washing and liquid separation was repeated until the water used for the washing exhibited neutrality.

Subsequently, 200 g of xylene and 0.18 g of potassium hydroxide were added to the xylene solution, and stirring was performed while heating. Heating was performed up to 140° C., and then reflux was performed at 140° C. for 3 hours. After cooling, neutralization was performed using a phosphoric acid to adjust so that the nonvolatile content was 50 mass %, thereby obtaining a resinoid vinyl group-containing methylpolysiloxane B4.

In the obtained vinyl group-containing methylpolysiloxane B4, the number of hydrogen atoms derived from $CH_2$ groups/the number of hydrogen atoms derived from Si—$CH_3$ groups obtained by $^1$H-NMR was 0.0140. This shows that the OR/SiMe in B4 was 0.021.

Further, it is found from the charged amounts of the starting materials and the result of $^1$H-NMR that the obtained vinyl group-containing methylpolysiloxane B4 has the $M^{vi}$ unit, the M unit, the Q unit, and the OE unit, and the molar ratio among the units is $M^{vi}$ unit:M unit:Q unit:OE unit=0.070:0.371:0.559:0.026. The Mw of B4 by GPC was 2340. Besides, an average unit formula of B4 obtained from the above-described molar ratio and Mw was $M^{vi}_{2.3}M_{12.2}Q_{18.4}(OE)_{0.86}$ and the number of alkenyl groups bonded to silicon atoms in one molecule was 2.3 on average.

Synthesis Example 5 (Synthesis of a Polymethylhydrogensiloxane C1)

1390 g (0.44 mol) of polymethylhydrogensiloxane represented on average by a formula: $MD^H_{50}M$, 1406 g (4.75 mol) of octamethylcyclotetrasiloxane, and 83 g (0.51 mol) of hexamethyldisiloxane, together with 25 g of activated clay were put into and stirred in a flask, and made to undergo an equilibration reaction at 50 to 70° C. for 6 hours. Note that in the following description, "represented on average by a formula: XX" is expressed by "represented by an average formula: XX".

Next, the reaction solution was filtrated to remove the activated clay, then the temperature was increased up to 140° C. under a reduced pressure of 5 mmHg or less, and then heating and stirring were performed at 140 to 150° C. for 6 hours under the reduced pressure.

The polymethylhydrogensiloxane C1 thus obtained is found to be represented by an average formula: $MD^H_{23}D_{20}M$ from the charged amounts of the starting materials. The content rate of the Si-bonded hydrogen atoms in C1 obtained from this formula was 7.6 mmol/g.

The weight decrease rate of the polymethylhydrogensiloxane C1 by TGA was 0.16 wt % at 140° C. and 0.26 wt % at 180° C. Note that the TGA measurement was performed under the condition that the temperature was increased at a temperature increasing rate of 5° C. per minute from room temperature using TG/DTA 6200 (manufactured by SII Nano Technology, Inc.). The TGA measurement for C2 to C6 is the same as this.

Synthesis Example 6 (Synthesis of a Polymethylhydrogensiloxane C2)

1985 g (0.40 mol) of polymethylhydrogensiloxane represented by an average formula: $MD^H_{80}M$, and 1421 g (4.80 mol) of octamethylcyclotetrasiloxane, together with 30 g of activated clay were put into and stirred in a flask, and made to undergo an equilibration reaction at 50 to 70° C. for 6 hours.

Next, the reaction solution was filtrated to remove the activated clay, then the temperature was increased up to 130° C. under a reduced pressure of 5 mmHg or less, and then heating and stirring were performed at 130 to 140° C. for 6 hours under the reduced pressure. Subsequently, thin-film distillation was further performed. More specifically, 500 g of the reaction solution after the heating and stirring was distilled at 130° C. for about 10 hours under the reduced pressure using a thin-film distillation apparatus (manufactured by Kobelco Eco-Solutions Co., Ltd., apparatus name: TYPE 2-03 WIPRENE), and thereby subjected to removal of a low-molecular weight substance having a lower boiling point.

The polymethylhydrogensiloxane C2 thus obtained is found to be represented by an average formula: $MD^H_{80}D_{48}M$ (the number of silicon atoms of 130) from the charged amounts of the starting materials. The content rate of the Si-bonded hydrogen atoms in C2 obtained from this formula was 9.4 mmol/g. Besides, the weight decrease rate of the polymethylhydrogensiloxane C2 by TGA was less than 0.1 wt % at 140° C. and 0.20 wt % at 180° C.

Synthesis Example 7 (Synthesis of a Polymethylhydrogensiloxane C3)

1092 g (0.22 mol) of polymethylhydrogensiloxane represented by an average formula: $MD^H_{80}M$, and 1302 g (4.40 mol) of octamethylcyclotetrasiloxane, together with 22 g of activated clay were put into and stirred in a flask, and made to undergo an equilibration reaction at 50 to 70° C. for 6 hours.

Next, the reaction solution was filtrated to remove the activated clay, then the temperature was increased up to 130°

C. under a reduced pressure of 5 mmHg or less, and then heating and stirring were performed at 130 to 140° C. for 6 hours under the reduced pressure. Subsequently, a low-molecular weight substance having a lower boiling point was removed using the above-described thin-film distillation apparatus, to obtain a polymethylhydrogensiloxane C3.

The obtained polymethylhydrogensiloxane C3 is found to be represented by an average formula: $MD^H{}_{80}D_{80}M$ (the number of silicon atoms of 162) from the charged amounts of the starting materials. The content rate of the Si-bonded hydrogen atoms in C3 obtained from this formula was 7.4 mmol/g. Besides, the weight decrease rate of the polymethylhydrogensiloxane C3 by TGA was 0.20 wt % at 140° C. and 0.23 wt % at 180° C.

Synthesis Example 8 (Synthesis of a Polymethylhydrogensiloxane C4)

500 g of toluene, 830 g (4.0 mol) of tetraethoxysilane, and 760 g (8.0 mol) of dimethylchlorosilane were charged and uniformly dissolved. This was dropped into excessive water put in a reaction container equipped with a stirrer, a dropping apparatus, a heating and cooling apparatus, and a pressure reducing apparatus while being stirred, and cohydrolysis and condensation were performed at room temperature while heat of solution of a by-produced hydrochloric acid was being removed by cooling. An obtained organic phase was washed with water until the washing water exhibited neutrality and then dehydrated, and toluene and a by-produced tetramethyldisiloxane were distilled off at 100° C./667 Pa (5 mmHg) to obtain a liquid polymethylhydrogensiloxane C4.

The obtained polymethylhydrogensiloxane C4 was found to be a polymethylhydrogensiloxane in a resin structure represented by a formula: $M^H{}_8Q_4$ (the number of silicon atoms of 12) from a ratio between units ($M^H$:Q=2:1) obtained by the measurement of $^{29}$Si-NMR and an Mw of 775 obtained by GPC. The content rate of the Si-bonded hydrogen atoms in the polymethylhydrogensiloxane C4 was 10.3 mmol/g.

Besides, the weight decrease rate of the polymethylhydrogensiloxane C4 by TGA was 3.56 wt % at 140° C. and 15.7 wt % at 180° C.

Synthesis Example 9 (Preparation of a Polymethylhydrogensiloxane C5)

The polymethylhydrogensiloxane C1 obtained in Synthesis Example 5 was subjected to thin-film distillation. More specifically, 500 g of C1 was distilled at 130° C. for about 10 hours under the reduced pressure using the thin-film distillation apparatus (manufactured by Kobelco Eco-Solutions Co., Ltd., apparatus name: TYPE 2-03 WIPRENE), and thereby subjected to removal of a low-molecular weight substance having a lower boiling point.

The weight decrease rate of the thus obtained polymethylhydrogensiloxane C5 by TGA was less than 0.1 wt % at 140° C. and less than 0.1 wt % even at 180° C.

Synthesis Example 10 (Preparation of a Polymethylhydrogensiloxane C6)

The polymethylhydrogensiloxane C4 obtained in Synthesis Example 8 was subjected to thin-film distillation. More specifically, 500 g of C4 was distilled at 130° C. for about 10 hours under the reduced pressure using the thin-film distillation apparatus (manufactured by Kobelco Eco-Solutions Co., Ltd., apparatus name: TYPE 2-03 WIPRENE), and thereby subjected to removal of a low-molecular weight substance having a lower boiling point.

The weight decrease rate of the thus obtained polymethylhydrogensiloxane C6 by TGA was 0.21 wt % at 140° C. and 4.27 wt % even at 180° C.

Example 1

400 parts by mass (hereinafter, referred to simply as parts) of a straight-chain dimethylpolysiloxane A1 (the viscosity of 70,000 mPa·s) having both ends terminated with dimethylvinylsiloxy groups, and 1200 parts of a xylene solution (50 mass %) of the resinoid methylpolysiloxane B1 (the Mw of 3400, the number of vinyl groups in one molecule of 2.0 on average, the OR/SiMe=0.013) obtained in Synthesis Example 1 were mixed together (the mass ratio of mixture of (A1):(B1)=4:6 by nonvolatile content) and heated to 150° C. under a reduced pressure, and thereby xylene was removed.

Subsequently, 100 parts of the thus obtained vinyl group-containing polymer mixture (1), 9.0 parts of the methylhydrogenpolysiloxane C1 represented by an average formula: $MD^H{}_{23}D_{20}M$ obtained in Synthesis Example 5 (the molar ratio of the Si-bonded hydrogen atoms in the (C1) component to the vinyl groups in the vinyl group-containing polymer mixture (1) (H/Vi)=1.8), and such an amount of the (D) platinum complex solution having a tetramethyltetravinylcyclotetrasiloxane as a ligand that it was 2 ppm of the whole composition as a Pt component were mixed together to prepare a polyorganosiloxane composition.

Examples 2 to 5

A straight-chain dimethylpolysiloxane A1 (the viscosity of 70,000 mPa·s) having both ends terminated with dimethylvinylsiloxy groups, one of the resinoid methylpolysiloxanes B1, B3, B4 obtained in Synthesis Examples 1, 3, 4 as the (B) component, one of the methylhydrogenpolysiloxanes C2 to C3 and C5 to C6 obtained in Synthesis Examples 6 to 7 and 9 to 10 as the (C) component, and the (D) platinum complex solution having a tetramethyltetravinylcyclotetrasiloxane as a ligand were compounded at respective proportions listed in Table 1 and mixed together as in Example 1 to prepare polyorganosiloxane compositions.

Note that in Example 4, a vinyl group-containing polymer mixture was used which was obtained by mixing 460 parts of the straight-chain dimethylpolysiloxane A1 and 1080 parts of a xylene solution (50 mass %) of the resinoid methylpolysiloxane B3 (the Mw of 3740, the number of vinyl groups in one molecule of 2.2 on average, the OR/SiMe=0.013) obtained in Synthesis Example 3 (the mass ratio of mixture of (A1):(B3)=46:54 by nonvolatile content), heating a mixed solution to 150° C. under a reduced pressure, and removing xylene from the mixture.

Further, in Example 5, a vinyl group-containing polymer mixture was used which was obtained by mixing 580 parts of the straight-chain dimethylpolysiloxane A1 and 840 parts of a xylene solution (50 mass %) of the resinoid methylpolysiloxane B4 (the Mw of 2340, the number of vinyl groups in one molecule of 2.3 on average, the OR/SiMe=0.021) obtained in Synthesis Example 4 (the mass ratio of mixture of (A1):(B4)=58:42 by nonvolatile content), heating a mixed solution to 150° C. under a reduced pressure, and removing xylene from the mixture.

Comparative Example 1

400 parts of a straight-chain dimethylpolysiloxane A1 (the viscosity of 70,000 mPa·s) having both ends terminated with dimethylvinylsiloxy groups, and 1200 parts of a xylene solution (50 mass %) of the resinoid methylpolysiloxane B2 (the Mw of 1850, the number of vinyl groups in one molecule of 1.8 on average, the OR/SiMe=0.030) obtained in Synthesis Example 2 were mixed together (the mass ratio of mixture of (A1):(B2)=4:6 by nonvolatile content) and heated to 150° C. under a reduced pressure, and thereby xylene was removed.

Subsequently, 100 parts of the obtained vinyl group-containing polymer mixture (2), 14.3 parts of the methylhydrogenpolysiloxane C1 represented by an average formula: $MD^H{}_{23}D_{20}M$ obtained in Synthesis Example 5 (the molar ratio of the Si-bonded hydrogen atoms in the (C1) component to the vinyl groups in the vinyl group-containing polymer mixture (2) (H/Vi)=1.8), and such an amount of the (D) platinum complex solution having a tetramethyltetravinylcyclotetrasiloxane as a ligand that it was 2 ppm of the whole composition as a Pt component were mixed together to prepare a polyorganosiloxane composition.

Comparative Example 2

600 parts of a straight-chain dimethylpolysiloxane A1 (the viscosity of 70,000 mPa·s) having both ends terminated with dimethylvinylsiloxy groups, and 800 parts of a xylene solution (50 mass %) of the resinoid methylpolysiloxane B2 (the Mw of 1850, the number of vinyl groups in one molecule of 1.8 on average, the OR/SiMe=0.030) obtained in Synthesis Example 2 were mixed together (the mass ratio of mixture of (A1):(B2)=6:4 by nonvolatile content) and heated to 150° C. under a reduced pressure, and thereby xylene was removed.

Subsequently, 100 parts of the obtained vinyl group-containing polymer mixture (3), 6.7 parts of the methylhydrogenpolysiloxane C4 represented by a formula: $M^H{}_8Q_4$ obtained in Synthesis Example 8 (the molar ratio of the Si-bonded hydrogen atoms in the (C4) component to the vinyl groups in the vinyl group-containing polymer mixture (3) (H/Vi)=1.7), and such an amount of the (D) platinum complex solution having a tetramethyltetravinylcyclotetrasiloxane as a ligand that it was 2 ppm of the whole composition as a Pt component were mixed together to prepare a polyorganosiloxane composition.

The properties of the polyorganosiloxane compositions thus obtained in Examples 1 to 5 and Comparative Examples 1 to 2 were measured and evaluated as described below. The results are listed in Table 1.

[Physical Properties after Curing]

The polyorganosiloxane compositions obtained in Examples 1 to 5 and Comparative Examples 1 to 2 were cured by heating at 130° C. for 15 minutes after molding to produce sheets each having a thickness of 2 mm. Test pieces each having a size according to JIS K6249 were cut out from the obtained sheets, and the hardness (TYPE A) at 23° C., the tensile strength [MPa], and the elongation [%] of them were measured according to JIS K6249.

[Transmittance]

The polyorganosiloxane compositions obtained in Examples 1 to 5 and Comparative Examples 1 to 2 were cured by heating them at 130° C. for 15 minutes in the metal mold to produce sheets each having a thickness of 2 mm. Test pieces (30 mm long×30 mm wide) produced from the obtained sheets were irradiated with light having a wavelength of 400 nm, and the transmittance of each of them was measured. The measurement of the transmittance was carried out using a spectrophotometric colorimeter (manufactured by KONICA MINOLTA Inc., apparatus name; CM-3500d).

[Mold Release Property]

The polyorganosiloxane compositions obtained in Examples 1 to 5 and Comparative Examples 1 to 2 were each injected into a metal mold of 220 mm long×20 mm wide×3 mm deep and cured by heating them at 160° C. for 5 minutes. After cooling to room temperature, the release force required for releasing the cured product from the metal mold was measured. The measurement of the release force was performed by a method of fixing the metal mold, sandwiching an end portion of the cured product in the metal mold by an autograph, vertically pulling up the cured product at a speed of 10 mm per second to release the cured product from the metal mold.

[Moldability]

About the polyorganosiloxane compositions obtained in Examples 1 to 5 and Comparative Examples 1 to 2, the metal mold contamination property was evaluated. Molding of injecting each of the compositions into a metal mold (20 mm long×170 mm wide, 2 mm deep) and curing it was repeated 1000 shots at each of molding temperatures of 140° C. and 180° C. using EC100N Injection Molding Machine manufactured by TOSHIBA CORPORATION. Note that the curing time was set to 30 seconds for each of the molding temperatures. Thereafter, the contamination on the molding surface of the metal mold was visually observed and evaluated according to the following criteria.

Evaluation Criteria

⊚: No extraneous matter nor tarnish existing on metal mold

○: Little tarnish existing on metal mold

X: Extraneous matter existing on metal mold

Further, the haze of the molded product obtained by performing injection molding at a molding temperature of 140° C. was measured. Then, the rate of change in haze was found from the following formula. For the measurement of the haze, a micro-TRI-gloss manufactured by BYK Gardner was used.

Rate of change in haze (%)={(haze of molded product at 1000th shot)−haze of molded product at 1st shot)/(haze of molded product at 1st shot)}×100

TABLE 1

| | | | Exam. 1 | Exam. 2 | Exam. 3 | Exam. 4 | Exam. 5 | Compara. Exam. 1 | Compara. Exam. 2 |
|---|---|---|---|---|---|---|---|---|---|
| Composition (Part By Mass) | (A) | Both Ends Vinyl Group-Containing Straight-chain Polysiloxane A1 (Viscosity 70000 mPa · s) | 40 | 40 | 40 | 46 | 58 | 40 | 60 |
| | (B) | Vinyl Group-Containing Resinoid Polysiloxane B1, Mw 3400, Vi 2.0/Molecule On Average, OR/SiMe = 0.013 | 60 | 60 | 60 | | | | |
| | | Vinyl Group-Containing Resinoid Polysiloxane B2, Mw 1850, Vi 1.8/Molecule On Average, OR/SiMe = 0.030 | | | | | | 60 | 40 |

TABLE 1-continued

|  |  |  | Exam. 1 | Exam. 2 | Exam. 3 | Exam. 4 | Exam. 5 | Compara. Exam. 1 | Compara. Exam. 2 |
|---|---|---|---|---|---|---|---|---|---|
|  |  | Vinyl Group-Containing Resinoid Polysiloxane B3, Mw 3740, Vi 2.2/Molecule On Average, OR/SiMe = 0.013 |  |  |  | 54 |  |  |  |
|  |  | Vinyl Group-Containing Resinoid Polysiloxane B4, Mw 2340, Vi 2.3/Molecule On Average, OR/SiMe = 0.021 |  |  |  |  | 42 |  |  |
|  | (C) | SiH-Containing Straight-chain Polysiloxane C1 (Si Number 45), SiH 7.6 mmol/g | 9.0 |  |  |  |  | 14.3 |  |
|  |  | SiH-Containing Straight-chain Polysiloxane C2 (Si Number 130) Thin-Film Distillation SiH 9.4 mmol/g |  | 7.5 |  |  |  |  |  |
|  |  | SiH-Containing Straight-chain Polysiloxane C3 (Si Number 162) Thin-Film Distillation SiH 7.4 mmol/g |  |  | 9.2 |  |  |  |  |
|  |  | SiH-Containing Resinoid Polysiloxane C4 (Si Number 12), SiH 10.3 mmol/g |  |  |  |  |  |  | 6.7 |
|  |  | SiH-Containing Polysiloxane C5 (Si Number 45) Thin-Film Distillation |  |  |  |  | 8.6 |  |  |
|  |  | SiH-Containing Polysiloxane C6 (Si Number 12) Thin-Film Distillation |  |  |  |  | 7.9 |  |  |
|  | (D) | Pt-Based Catalyst (As Pt Component) (ppm) | 2 | 3 | 2 | 2 | 2 | 2 | 2 |
| H/Vi Molar Ratio (H in (C) Component/Vi in (A), (B) Components) |  |  | 1.8 | 1.8 | 1.8 | 1.9 | 1.9 | 1.8 | 1.7 |
| Evaluation | Properties After Curing (2 mm) | Hardness (Type A) | 71 | 73 | 74 | 73 | 77 | 79 | 68 |
|  |  | Tensile Strength (MPa) | 8.7 | 6.1 | 8.9 | 10.2 | 11.6 | 9.1 | 10.3 |
|  |  | Elongation (%) | 100 | 400 | 210 | 120 | 90 | 100 | 100 |
|  |  | Transmittance, 400 nm (%) | 92 | 92 | 93 | 93 | 94 | 92 | 93 |
|  | Mold Release Property | Peel Test (Gf) | 22 | 25 | 18 | 19 | 24 | 43 | 49 |
|  | Moldability (Metal Mold Contamination) | Molding Temperature 140° C. | ◎ | ◎ | ◎ | ◎ | ◎ | X | X |
|  |  | Molding Temperature 180° C. | ○ | ◎ | ◎ | ◎ | ○ | X | X |
|  | Moldability (Haze Change Rate) (%) | Molding Temperature 140° C. | 30 | 20 | 20 | 20 | 30 | 540 | 770 |

The following is found from Table 1. Specifically, the polyorganosiloxane compositions in Examples 1 to 5 made by compounding the components of (A) to (D) at predetermined compositions defined in the present invention are superior in mold release property of the cured products with respect to the metal mold, small in force required for release, and no contaminating the metal mold even when injection molding is repeatedly performed. Further, their molded products have less change in haze and keep initial transparency. Further, their cured products have a high light transmittance of 90% or more and are excellent in transparency. Furthermore, the physical properties such as hardness, tensile strength, elongation and the like of the cured products are also excellent.

In contrast to the above, in the polyorganosiloxane composition of Comparative Example 1, the resinoid polyorganosiloxane being the (B) component is prepared by a method different from those of the resinoid polyorganosiloxane compositions compounded in Examples 1 to 5, and the number of alkenyl groups in one molecule is less than 2 on average. Therefore, the cured product to be obtained is inferior in metal mold release property and non-contamination property in comparison with the cured products in Examples 1 to 5.

Besides, the polyorganosiloxane composition of Comparative Example 2, in which the resinoid polyorganosiloxane having a number of alkenyl groups in one molecule of less than 2 on average is used as the (B) component, and the methylhydrogenpolysiloxane having a weight decrease rate (up to 140° C.) of more than 2.0 wt % is used as the (C) component, is therefore poor in contamination property to the metal mold as in Comparative Example 1, and is poorer in mold release property than in Comparative Example 1.

Further, molded products made by repeatedly performing injection molding using the polyorganosiloxane compositions in Comparative Examples 1 and 2 have larger change in haze and greatly decrease in initial transparency.

According to the polyorganosiloxane composition for molding of the present invention, a cured product having sufficient rubber hardness and excellent metal mold release property and mechanical properties (strength, elongation and the like) can be obtained. Further, the polyorganosiloxane composition for molding does not contaminate the metal mold, and therefore can enhance the productivity of molded products. Furthermore, its cured product can be suppressed in change in color (yellowing) and is thus excellent in transparency.

Consequently, the molded product obtained from the polyorganosiloxane composition is suitable, for example, for a sealing material of a light-emitting element in a light emitting device such as an LED device, and an optical member such as a functional lens and the like. In particular, the molded product can be suitably used as a lens and cover of an outdoor light source and automobile light source.

What is claimed is:

1. A polyorganosiloxane composition for molding comprising:
    (A) a straight-chain polyorganosiloxane having on average two or more alkenyl groups bonded to silicon atoms in one molecule and having a viscosity at 25° C. of 10,000 to 1,000,000 mPa·s;
    (B) 30 to 80 mass % of a polyorganosiloxane relative to a total of the (A) component and this component (B), the polyorganosiloxane including a resin structure containing on average:

a monofunctional siloxane unit (a) represented by a formula: $R^1_3SiO_{1/2}$, wherein $R^1$s independently represent an alkenyl group or a substituted or unsubstituted alkyl group;

a bifunctional siloxane unit (b) represented by a formula: $R^1_2SiO_{2/2}$, wherein $R^1$s are as in the above; and and a tetrafunctional siloxane unit (c) represented by a formula: $SiO_{4/2}$, at a molar ratio of a:b:c, wherein $0.3 \leq a \leq 0.6$, $0 \leq b \leq 0.1$, $0.4 \leq c \leq 0.7$, and a relation of $a+b+c=1$ is satisfied, and the resin structure having on average two or more alkenyl groups bonded to silicon atoms in one molecule;

(C) an amount of a polyorganohydrogensiloxane having a hydrogen atom bonded to a silicon atom, an average degree of polymerization of 10 or more, a content of the hydrogen atom of 5.0 mmol/g or more and 11.0 mmol/g or less, and a weight decrease rate up to 140° C. by thermogravimetric analysis (TGA) of 2.0 wt % or less so that an amount of the hydrogen atom in this component is 1.0 to 3.0 mol relative to a total 1 mol of the alkenyl group in the (A) component and the alkenyl group in the (B) component; and (D) a catalytic amount of a hydrosilylation reaction catalyst, wherein the (B) component includes a polyorganosiloxane having:

one or more substituted or unsubstituted alkyl groups bonded to silicon atoms in one molecule and an alkoxy group bonded to silicon atoms in one molecule; and a molar ratio of the alkoxy groups to the substituted or unsubstituted alkyl groups (a number of moles of alkoxy groups/a number of moles of substituted or unsubstituted alkyl groups) is 0.030 or less.

2. The polyorganosiloxane composition for molding according to claim 1, wherein the straight-chain polyorganosiloxane being the (A) component has a viscosity at 25° C. of 50,000 to 500,000 mPa·s.

3. The polyorganosiloxane composition for molding according to claim 1, wherein the (B) component includes:
a monofunctional siloxane unit represented by a formula: $(CH_3)_2(CH_2=CH)SiO_{1/2}$;
a monofunctional siloxane unit represented by a formula: $(CH_3)_3SiO_{1/2}$; and
a tetrafunctional siloxane unit represented by a formula: $SiO_{4/2}$.

4. The polyorganosiloxane composition for molding according to claim 1, wherein the (B) component has a weight-average molecular weight Mw of 1500 or more by gel permeation chromatography (GPC).

5. The polyorganosiloxane composition for molding according to claim 1, wherein a content rate of the (B) component to a total of the (A) component and the (B) component is 35 to 70 mass %.

6. The polyorganosiloxane composition for molding according to claim 1, wherein the (C) component includes a straight-chain polyorganohydrogensiloxane having a weight decrease rate up to 180° C. by thermogravimetric analysis (TGA) is 2.0 wt % or less.

7. The polyorganosiloxane composition for molding according to claim 1, wherein the (C) component includes a straight-chain polyorganohydrogensiloxane represented by
a general formula: $(R^2_3SiO_{1/2})(R^2HSiO_{2/2})_x(R^2_2SiO_{2/2})_y(R^2_3SiO_{1/2})$, or
a general formula: $(R^2_2HSiO_{1/2})(R^2HSiO_{2/2})_x(R^2_2SiO_{2/2})_y(R^2_2HSiO_{1/2})$,
wherein $R^2$s independently represent a substituted or unsubstituted monovalent hydrocarbon group except an alkenyl group, both x and y are positive integer numbers, and a relation of $30 \leq x+y \leq 200$ and a relation of $0.4 \leq x/(x+y) \leq 0.7$ is satisfied.

8. The polyorganosiloxane composition for molding according to claim 1, wherein the (D) hydrosilylation reaction catalyst is a platinum-based metal compound.

9. The polyorganosiloxane composition for molding according to claim 1, containing no inorganic filler and having a viscosity measured by a rotational viscometer at 25° C. of 10,000 to 1,000,000 mPa·s.

10. The polyorganosiloxane composition for molding according to claim 1, containing no inorganic filler and a transmittance of light with a wavelength of 400 nm of 85% or more in a cured product having a thickness of 6 mm.

11. An optical member, a light source lens or cover made by curing the polyorganosiloxane composition for molding according to claim 1.

12. The optical member, the light source lens or cover according to claim 11, wherein the optical member is at least one kind selected from a primary or secondary lens for LED, a thick optical lens, a reflector for LED, an automobile LED matrix lighting lens, an augmented reality optical member, a silicone optical head for an LED chip, and a work light lens and reflector.

13. The optical member, the light source lens or cover according to claim 11, wherein the light source is at least one kind selected from indoor or outdoor lighting, a reading light and accent lighting of public transport, and an LED street light.

14. The optical member, the light source lens or cover according to claim 11, wherein the optical member is at least one kind selected from an illumination optical member for smartphone or tablet, an LED display for computer or television, and a light guide.

15. A molding method comprising: molding by a method selected from injection molding, compression molding, transfer molding, potting, and dispensing, using the polyorganosiloxane composition for molding according to claim 1.

* * * * *